(12) United States Patent
Hamad

(10) Patent No.: US 10,563,555 B2
(45) Date of Patent: Feb. 18, 2020

(54) ROTARY CONTACTOR FOR VEHICLE CARBON DIOXIDE CAPTURE

(71) Applicant: Saudi Arabian Oil Company, Dhahran (SA)

(72) Inventor: Esam Z. Hamad, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 99 days.

(21) Appl. No.: 15/788,474

(22) Filed: Oct. 19, 2017

(65) Prior Publication Data
US 2019/0120106 A1 Apr. 25, 2019

(51) Int. Cl.
*F01N 5/02* (2006.01)
*F01N 3/08* (2006.01)
(Continued)

(52) U.S. Cl.
CPC .......... *F01N 3/0857* (2013.01); *B01D 53/06* (2013.01); *B01J 20/28035* (2013.01);
(Continued)

(58) Field of Classification Search
CPC .... F01N 3/0857; F01N 3/0871; F01N 3/0885; F01N 2570/10; B01D 2257/504
See application file for complete search history.

(56) References Cited

U.S. PATENT DOCUMENTS

| 4,775,484 A | 10/1988 | Schmidt et al. |
| 4,778,492 A | 10/1988 | Dawson |

(Continued)

FOREIGN PATENT DOCUMENTS

| EP | 1145755 A1 | 10/2001 |
| EP | 2258879 A1 | 12/2010 |

(Continued)

OTHER PUBLICATIONS

Hogg, Dougal; Rotary Adsorption Machine—for CO2 Capture, Scottish Carbon Capture and Storage; Howden Global ICCS Workshop; Oct. 10, 2013; INEOS, Grangemouth; http://www.sccs.org.uk/images/events/2013/ICCS-workshops/Workshop2/DougalHogg.pdf.

(Continued)

*Primary Examiner* — Jonathan R Matthias
(74) *Attorney, Agent, or Firm* — Bracewell LLP; Constance G. Rhebergen; Linda L. Morgan

(57) ABSTRACT

Systems and methods for capturing carbon dioxide ($CO_2$) in exhaust gases of a vehicle include delivering the exhaust gas to a cooled section of a rotary contactor, the rotary contactor including openings that extend from a first side of the rotary contactor to a second side of the rotary contactor. The $CO_2$ of the exhaust gas is adsorbed with a sorbent of the cooled section of the rotary contactor, where the non-$CO_2$ components of the exhaust gas pass through the openings. The cooled section of the rotary contactor is heated with a hot fluid of the vehicle to release the adsorbed $CO_2$ and convert the cooled section of the rotary contactor to a heated section of the rotary contactor. The heated section of the rotary contactor is cooled to convert the heated section of the rotary contactor back to the cooled section of the rotary contactor.

23 Claims, 4 Drawing Sheets

(51) Int. Cl.
   *B01D 53/06* (2006.01)
   *B01J 20/28* (2006.01)
   *F01K 25/10* (2006.01)

(52) U.S. Cl.
   CPC .............. *F01K 25/103* (2013.01); *F01N 5/02* (2013.01); *B01D 2253/10* (2013.01); *B01D 2253/34* (2013.01); *B01D 2257/504* (2013.01); *B01D 2258/01* (2013.01)

(56) References Cited

U.S. PATENT DOCUMENTS

| | | |
|---|---|---|
| 7,166,149 B2 | 1/2007 | Dunne et al. |
| 7,947,120 B2 | 5/2011 | Deckman et al. |
| 7,959,720 B2 | 6/2011 | Deckman et al. |
| 8,480,798 B1 | 7/2013 | Myers et al. |
| 8,715,394 B2 | 5/2014 | Caram et al. |
| 8,974,576 B2 | 3/2015 | Gupta et al. |
| 9,504,955 B2 | 11/2016 | Elliott et al. |
| 9,539,540 B2 | 1/2017 | Elliott et al. |
| 2001/0009124 A1 | 7/2001 | Suzuki et al. |
| 2005/0217481 A1 | 10/2005 | Dunne et al. |
| 2007/0072769 A1 | 3/2007 | Imada et al. |
| 2013/0061756 A1 | 3/2013 | Hung et al. |
| 2013/0298761 A1* | 11/2013 | Hamad .................... F01N 3/04 95/11 |
| 2015/0338098 A1 | 11/2015 | Boulet |
| 2018/0094560 A1* | 4/2018 | Williams ................. F01N 3/04 |

FOREIGN PATENT DOCUMENTS

| | | |
|---|---|---|
| EP | 2608867 B1 | 11/2016 |
| WO | 2012100149 A1 | 7/2012 |
| WO | 2012100157 A1 | 7/2012 |
| WO | 2012100165 A1 | 7/2012 |
| WO | 2012100182 A1 | 7/2012 |
| WO | 2013003955 A1 | 1/2013 |
| WO | 2014031996 A1 | 2/2014 |

OTHER PUBLICATIONS

The International Search Report and Written Opinion for related PCT application PCT/US2018/056408 dated Feb. 14, 2019.

Gibson et al., "Adsorption Materials and Processes for Carbon Capture from Gas Fired Power Plants: AMPGas", I&EC research, 2016, pp. 3840-3851, American Chemical Society.

* cited by examiner

ROTARY CONTACTOR FOR VEHICLE CARBON DIOXIDE CAPTURE

BACKGROUND OF THE DISCLOSURE

1. Field of the Disclosure

This disclosure relates generally to reducing green-house gas emissions, and more particularly to onboard capture of carbon dioxide ($CO_2$) from motor vehicle exhaust gases.

2. Description of the Related Art

Green-house gas emissions, such as $CO_2$ and methane ($CH_4$), are thought to contribute to global warming. About one quarter of global $CO_2$ emissions currently are produced by mobile sources, such as motor vehicles. This fraction could grow rapidly with the projected surge in car ownership in developing countries.

Onboard $CO_2$ capture is one option for managing $CO_2$ from mobile sources. Critical characteristics of onboard $CO_2$ capture systems include compactness and small pressure drop. One conventional approach to using sorbents to capture gases is packing the sorbents in static beds. This could lead to a larger pressure drop and limited heat and mass transfer. In mobile applications, where there are relatively large flow rates of exhaust gas and limited space, current sorbent systems would be unable to meet the requirements for the rate of transport of heat and mass that would allow for a short cycle between adsorption and regeneration in a compact system.

SUMMARY OF THE DISCLOSURE

Embodiments of this disclosure include systems and methods for $CO_2$ management from the exhaust of mobile sources such as passenger vehicles, trucks, buses, heavy-duty vehicles, trains, planes, ships and other mobile sources that operate through the combustion of carbon containing fuels. Systems of this disclosure could be installed on new mobile sources or retrofitted on existing mobile sources.

In embodiments of this disclosure $CO_2$ is captured by a solid sorbent arranged in a rotary contactor. Systems and methods of this disclosure provide a short cycle time due to fast heat and mass transfer, a compact design, and a small pressure drop over the rotary contactor. Energy in the hot exhaust gas or other available hot fluid of the vehicle can be used to provide the temperature difference needed for separation. The rotary contactor can include a rotating wheel with ducts made of, or covered with, a solid sorbent with affinity to $CO_2$. A sector of the wheel is heated directly or indirectly using the hot fluid from the vehicle to release the adsorbed $CO_2$ and the remaining sector is cooled by reduced temperature exhaust gas where the $CO_2$ adsorption takes place.

In an embodiment of this disclosure a method for capturing $CO_2$ in exhaust gases of a vehicle includes delivering the exhaust gas of the vehicle to a cooled section of a rotary contactor, the rotary contactor including openings that extend from a first side of the rotary contactor to a second side of the rotary contactor opposite the first side. The $CO_2$ of the exhaust gas is adsorbed with a sorbent of the cooled section of the rotary contactor, where the non-$CO_2$ components of the exhaust gas pass through the openings. The cooled section of the rotary contactor is heated with a hot fluid of the vehicle to release the adsorbed $CO_2$ and convert the cooled section of the rotary contactor to a heated section of the rotary contactor. The heated section of the rotary contactor is cooled to convert the heated section of the rotary contactor back to the cooled section of the rotary contactor.

In alternate embodiments, the rotary contactor can be located onboard the vehicle. The exhaust gas can be delivered to the cooled section of the rotary contactor in a direction perpendicular to a plane of rotation of the rotary contactor. The sorbent can be a solid sorbent coating located on a structured sheet. The structured sheet can include the openings and be shaped to maximize the sorbent capacity per unit volume of the rotary contactor. Alternately, the structured sheet can be shaped to minimize the pressure drop of the exhaust gas as it passes through the openings from the first side to the second side, or meet a maximum value of pressure drop while maximizing the sorbent capacity.

In other alternate embodiments, the method can further include before delivering the exhaust gas of the vehicle to the cooled section of the rotary contactor, passing the exhaust gas through an energy recovery device and the energy recovery device can generate energy for compressing the released $CO_2$. Alternately, after delivering the exhaust gas of the vehicle to the cooled section of the rotary contactor, the exhaust gas can be passed through the energy recovery device. The hot fluid of the vehicle can be a working fluid of the energy recovery device, a hot coolant of the vehicle, or a fluid heated by the exhaust gas in a heat exchanger. Cooling the heated section of the rotary contactor can include cooling the heated section of the rotary contactor with the exhaust gas downstream of the heat exchanger. The released $CO_2$ can be compressed and stored onboard the vehicle.

In an alternate embodiment of this disclosure, a method for capturing $CO_2$ in exhaust gases of a vehicle includes delivering the exhaust gas of the vehicle to a cooled section of a rotary contactor, the rotary contactor including openings that extend from a first side of the rotary contactor to a second side of the rotary contactor opposite the first side. The $CO_2$ of the exhaust gas is adsorbed with a sorbent of the cooled section of the rotary contactor. The rotary contactor is rotated so that the cooled section of the rotary contactor is in the path of a hot fluid of the vehicle and the cooled section of the rotary contactor is heated to release the adsorbed $CO_2$, converting the cooled section of the rotary contactor to a heated section of the rotary contactor. The rotary contactor is rotated so that the heated section of the rotary contactor is in the path of the exhaust gas and the heated section of the rotary contactor is cooled with the exhaust gas to convert the heated section of the rotary contactor back to the cooled section of the rotary contactor. The exhaust gas passes through an energy recovery device, the energy recovery device generating energy for compressing the released $CO_2$. The rotary contactor and the energy recovery device are located onboard the vehicle.

In alternate embodiments, the exhaust gas can be delivered to the cooled section of the rotary contactor in a direction perpendicular to a plane of rotation of the rotary contactor. The sorbent can be a solid sorbent coating located on a structured sheet that includes the openings. The exhaust gas can pass through the energy recovery device before delivering the exhaust gas to the cooled section of the rotary contactor. Alternately, the exhaust gas can pass through the energy recovery device after delivering the exhaust gas to the cooled section of the rotary contactor.

In yet another alternate embodiment of this disclosure, a system for capturing $CO_2$ in exhaust gases of a vehicle includes a rotary contactor having a cooled section operable to receive delivery of the exhaust gas of the vehicle, the rotary contactor including openings that extend from a first side of the rotary contactor to a second side of the rotary contactor opposite the first side. A sorbent is located on the cooled section of the rotary contactor operable to adsorb the $CO_2$ of the exhaust gas. A hot fluid is directed at the cooled section of the rotary contactor operable to release the adsorbed $CO_2$ and convert the cooled section of the rotary contactor to a heated section of the rotary contactor. The rotary contactor is rotatable so that the heated section of the rotary contactor is cooled to convert the heated section of the rotary contactor back to the cooled section of the rotary contactor.

In alternate embodiments, the rotary contactor can be located onboard the vehicle. The exhaust gas can be delivered to the cooled section of the rotary contactor in a direction perpendicular to a plane of rotation of the rotary contactor. The sorbent can be a solid sorbent coating located on a structured sheet. The structured sheet can include the openings and be shaped to maximize the sorbent capacity per unit volume of the rotary contactor. The structured sheet can include the openings and be shaped to minimize the pressure drop of the exhaust gas as it passes through the openings from the first side to the second side. An energy recovery device can be operable to generate energy for compressing the released $CO_2$. A purge sector can be positioned adjacent the second side of the rotary contactor at a junction of the cooled section and the heated section. A compressor can be operable to compress the released $CO_2$ and a storage unit can store the compressed $CO_2$.

BRIEF DESCRIPTION OF THE DRAWINGS

So that the manner in which the previously-recited features, aspects and advantages of the embodiments of this disclosure, as well as others that will become apparent, are attained and can be understood in detail, a more particular description of the disclosure briefly summarized previously may be had by reference to the embodiments that are illustrated in the drawings that form a part of this specification. It is to be noted, however, that the appended drawings illustrate only certain embodiments of the disclosure and are, therefore, not to be considered limiting of the disclosure's scope, for the disclosure may admit to other equally effective embodiments.

DETAILED DESCRIPTION OF THE DISCLOSURE

The disclosure refers to particular features, including process or method steps. Those of skill in the art understand that the disclosure is not limited to or by the description of embodiments given in the specification. The subject matter is not restricted except only in the spirit of the specification and appended Claims.

Those of skill in the art also understand that the terminology used for describing particular embodiments does not limit the scope or breadth of the embodiments of the disclosure. In interpreting the specification and appended Claims, all terms should be interpreted in the broadest possible manner consistent with the context of each term. All technical and scientific terms used in the specification and appended Claims have the same meaning as commonly understood by one of ordinary skill in the art to which this disclosure belongs unless defined otherwise.

As used in the Specification and appended Claims, the singular forms "a", "an", and "the" include plural references unless the context clearly indicates otherwise.

As used, the words "comprise," "has," "includes", and all other grammatical variations are each intended to have an open, non-limiting meaning that does not exclude additional elements, components or steps. Embodiments of the present disclosure may suitably "comprise", "consist" or "consist essentially of" the limiting features disclosed, and may be practiced in the absence of a limiting feature not disclosed. For example, it can be recognized by those skilled in the art that certain steps can be combined into a single step.

Where a range of values is provided in the Specification or in the appended Claims, it is understood that the interval encompasses each intervening value between the greater limit and the lesser limit as well as the greater limit and the lesser limit. The disclosure encompasses and bounds smaller ranges of the interval subject to any specific exclusion provided.

Where reference is made in the specification and appended Claims to a method comprising two or more defined steps, the defined steps can be carried out in any order or simultaneously except where the context excludes that possibility.

Figure 1:
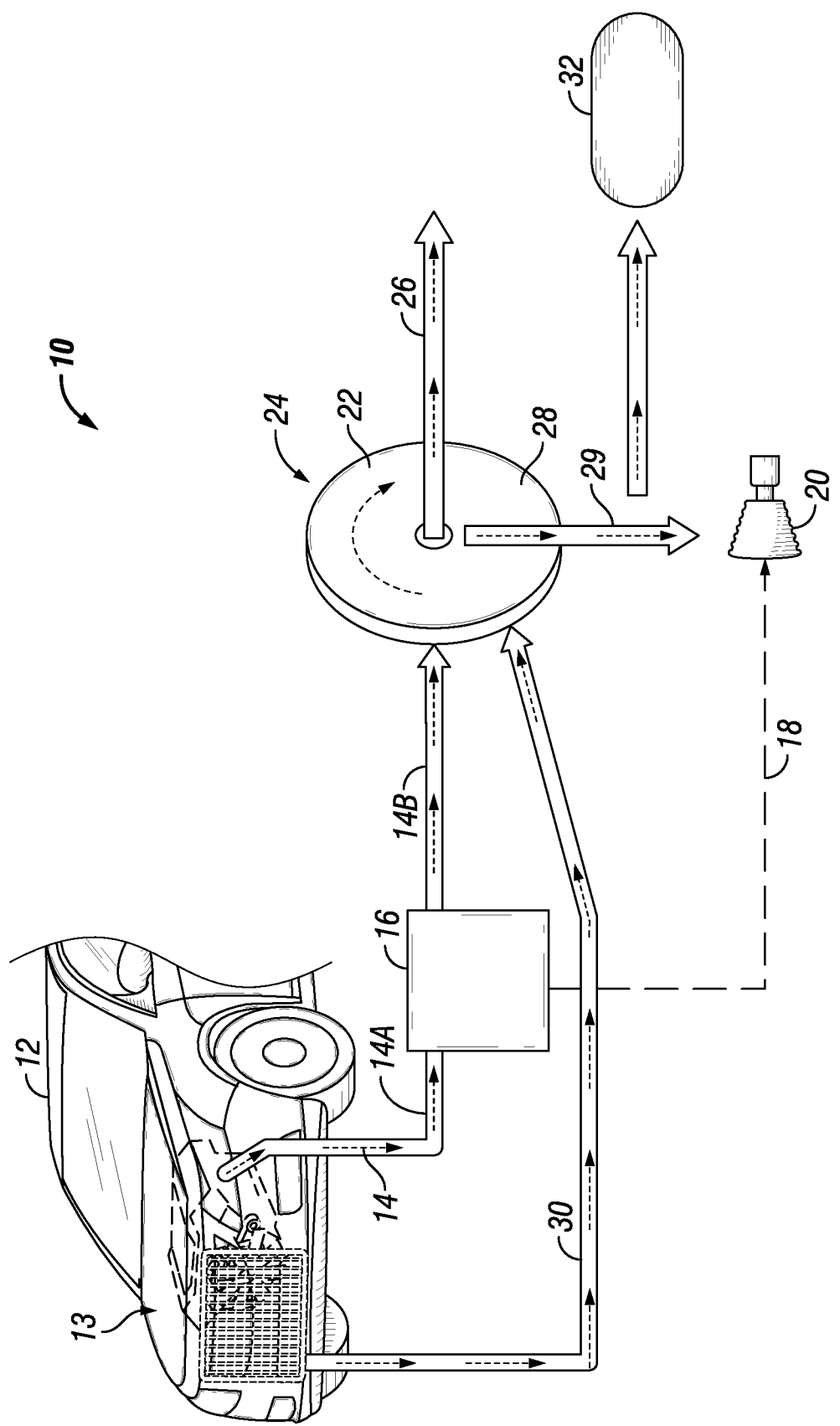
FIG. 1 is a schematic diagram of an onboard carbon dioxide capture system, in accordance with an embodiment of this disclosure.
Figure 2:
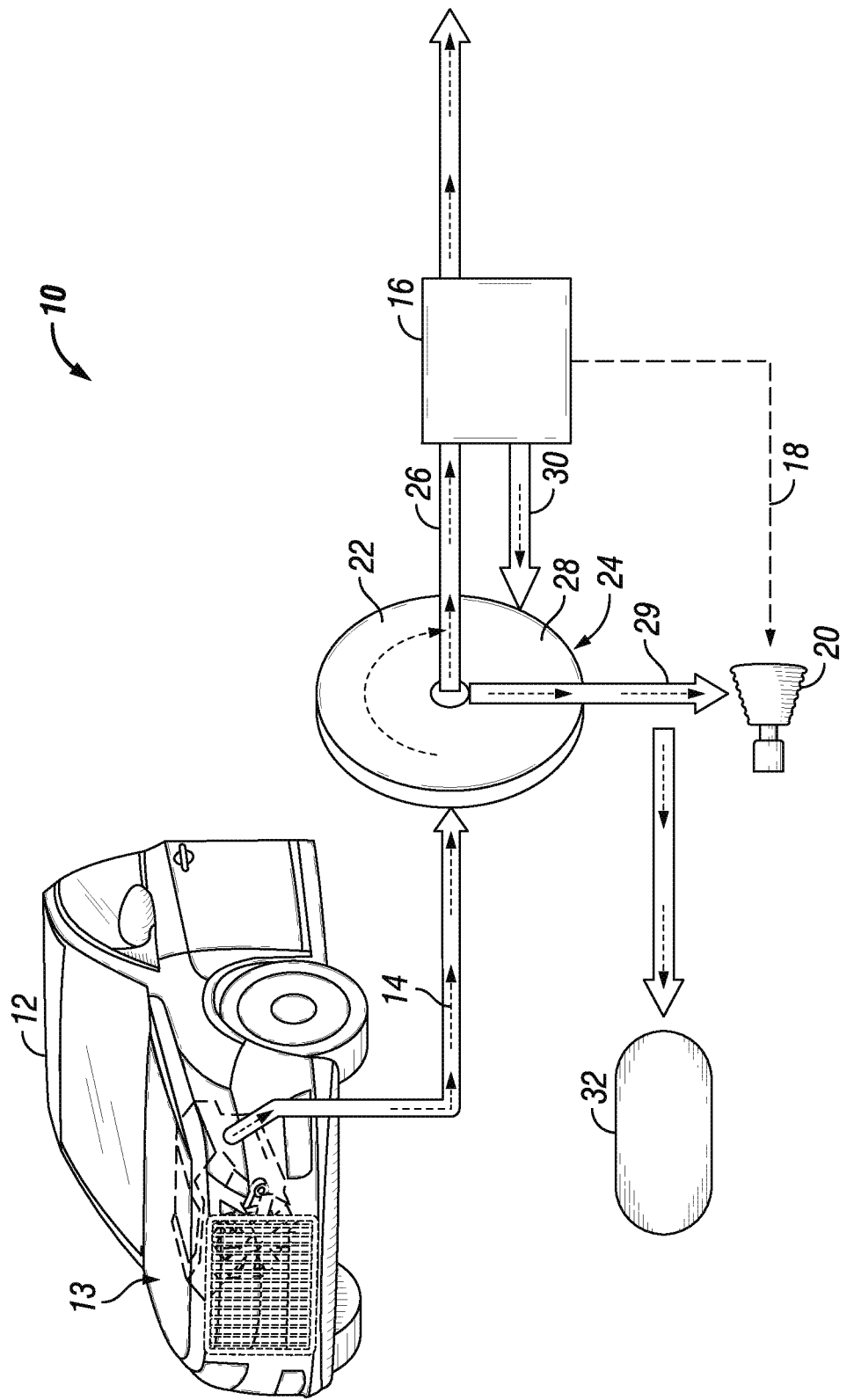
FIG. 2 is a schematic diagram of an onboard carbon dioxide capture system, in accordance with an alternate embodiment of this disclosure.

Looking at FIG. 1, a schematic diagram of onboard $CO_2$ capture system 10 is shown. The components of onboard $CO_2$ capture system 10 are all located onboard vehicle 12. However, for the sake of clarity certain features of onboard $CO_2$ capture system 10 are shown in FIGS. 1-2 apart from vehicle 12. Vehicle 12 can be, for example, a mobile source such a passenger vehicle, truck, bus, heavy-duty vehicle, train, plane, ship or any other mobile source that operates through the combustion of carbon containing fuels. The combustion of carbon containing fuels by vehicle 12 in engine 13 results in exhaust gases 14. Exhaust gases 14 can include $CO_2$.

In the embodiment of FIG. 1, hot exhaust gases 14a are first delivered to, and pass through, energy recovery device 16. Energy recovery device 16 can generate energy for compressing $CO_2$. Energy recovery device 16 can be, as an example, a turbocompounding waste heat recovery system or an organic Rankine cycle. In embodiments where energy recovery device 16 is a turbocompounding waste heat recovery system additional synergies can be realized.

One synergy of the use of turbocompounding is the use of the heat of exhaust gases 14 to generate energy output 18 to provide either electrical or mechanical energy for all or part of the energy needed for compressor 20 to compress $CO_2$. As an example, compressor 20 can compress the $CO_2$ to about 100 bar. When sorbent with a lower regeneration temperature is used, another possible synergy is the use of heat remaining in exhaust gases 14 leaving energy recovery device 16 being removed in a heat exchanger and used as hot fluid 30, which will also provide the benefit of further reducing the temperature of exhaust gases 14.

In alternate examples, energy recovery device 16 can be any known type of energy recovery system capable of utilizing the heat of exhaust gases 14 to generate energy for compressing $CO_2$. Energy output 18 generated by energy recovery device 16 can be either electrical or mechanical energy that can provide all or part of the energy needed for compressor 20 to compress $CO_2$.

Energy recovery device 16 will cause the temperature of exhaust gases 14 to decrease so that the exhaust gases 14 exiting energy recovery device 16 are cooled exhaust gases 14b. Depending on the absorption temperature of the solid sorbent, the cooled exhaust gases 14b are delivered to cooled section 22 of rotary contactor 24. If the exhaust gases are not cool enough, then the exhaust gases could be further cooled by passing the exhaust gases through a heat exchanger with ambient air or liquid coolant. Rotary contactor 24 can be a rotating wheel shaped device with openings or ducts made of, or covered with, a solid sorbent with affinity to $CO_2$. As discussed further in this disclosure, cooled section 22 of rotary contactor 24 can adsorb $CO_2$ from exhaust gases 14, while the remaining unadsorbed gas, such as non-$CO_2$ components 26 of exhaust gases 14, can pass through rotary contactor 24. As an example, the non-$CO_2$ components 26 of exhaust gases 14 can include nitrogen gas ($N_2$), water ($H_2O$), and other known components of exhaust gases from the combustion of carbon containing fuels. After passing through rotary contactor 24, non-$CO_2$ components 26 can pass to the atmosphere.

Rotary contactor 24 also includes heated section 28. Heated section 28 can be heated by a hot fluid 30 of vehicle 12 to release the adsorbed $CO_2$ as a stream of released $CO_2$ 29. Hot fluid 30 can be, for example, hot coolant, hot engine oil, a hot portion of exhaust gases 14, a working fluid of energy recovery device 16, or a heating fluid that has been heated by any such example hot fluid 30. As an example, hot coolant of some vehicles could be used regenerate sorbents at temperatures between 75-100 degrees Celsius (° C.). There are a number of suitable sorbent material that can release $CO_2$ in this temperature range.

Heated section 28 can be heated by conduction, convection, or radiation, or any combination of conduction, convection, and radiation. In certain examples, the hot portion of exhaust gases 14 can be a hot carrier that is easily separated from $CO_2$, such as steam. The flow of exhaust gases 14 and hot fluid 30 can be in countercurrent (FIGS. 2 and 4) or co-current (FIGS. 1 and 3) directions. The flow of exhaust gases 14 and hot fluid 30 can be in a direction generally perpendicular to a plane of rotation of rotary contactor 24.

In embodiments of this disclosure, as shown in FIGS. 1-2, rotary contactor 24 has only cooled section 22 and heated section 28. Rotary contactor 24 can be constantly rotating so that cooled section 22 is heated by hot fluid 30 as rotary contactor 24 rotates past a source of hot fluid 30, converting cooled section 22 of rotary contactor 24 to heated section 28 of rotary contactor 24. The source of hot fluid 30 can be stationary relative to vehicle 12. Heated section 28 is cooled by exhaust gases 14 as rotary contactor 24 rotates past a source of exhaust gases 14 to convert heated section 28 of rotary contactor 24 to cooled section 22 of rotary contactor 24. The source of exhaust gases 14 can be stationary relative to vehicle 12.

Having only two sections will allow the system to be simpler, more compact and more cost effective than systems with rotary contactors having more than two zones. Embodiments of this disclosure can meet a target of capturing and compressing 60% or less of the $CO_2$ in exhaust gases 14 without burning additional fuel in engine 13 that would be required to operate systems that have more than two zones.

$CO_2$ is adsorbed from exhaust gases 14 in cooled section 22. The cooling of cooled section 22 takes place simultaneously with adsorption by cooled exhaust gases 14b. $CO_2$ is released from the sorbent of rotary contactor 24 in heated section 28 as released $CO_2$ 29. Released $CO_2$ 29 that is released from the sorbent of rotary contactor 24 can be collected and delivered to compressor 20 and then stored onboard vehicle 12 in storage unit 32. $CO_2$ that is stored in storage unit 32 can be unloaded at a later time, such as when vehicle 12 is being refueled. Rotary contactor 24, energy recovery device 16, compressor 20 and storage unit 32 are all located onboard vehicle 12.

Looking at FIG. 2, in an alternate embodiment, energy recovery device 16 can be located downstream of rotary contactor 24. When rotary contactor 24 is placed downstream engine 13 of vehicle 12, but upstream of a turbocompounding energy recovery device 16, exhaust gases 14 will be at a greater pressure entering rotary contactor 24 than if energy recovery device 16 is located upstream of rotary contactor 24. The use of a turbocompounder results in the pressure of exhaust gases 14 being kept relatively high after exhausts gases 14 leave the engine 13, before it is used to drive a turbine of energy recovery device 16. The pressure of exhaust gases 14 can drop to ambient after the turbine of energy recovery device 16. Having increased pressure exhaust gases 14 provides for the capacity of the sorbent being higher, leading to small wheel size and a more compact system. Depending on the pressure, the wheel size could be two to three times smaller. Having a greater gas pressure will result in less sorbent being needed for the same amount of $CO_2$ captured. The size of the capture system is roughly inversely proportional to pressure (at the low pressure range of adsorption). As an example, if the pressure of exhaust gases 14 after the engine 13 is 2 bar and the pressure of exhaust gases after energy recovery device 16 is 1 bar, then the wheel size of rotary contactor 24 can be half the size in the embodiment with energy recovery device 16 downstream of rotary contactor 24 compared to the embodiment with energy recovery device 16 upstream of rotary contactor 24.

At the increased pressure section of turbocompounding the temperature will still be greater (250 to 600° C.) and little cooling of exhaust gases 14 would be needed if a high temperature sorbent is used, such as metal oxides or carbonates. An additional advantage of this arrangement is that the $CO_2$ will be at a greater pressure leaving rotary contactor 24, which will reduce the power needed for further compression of $CO_2$ in compressor 20.

Figure 3:
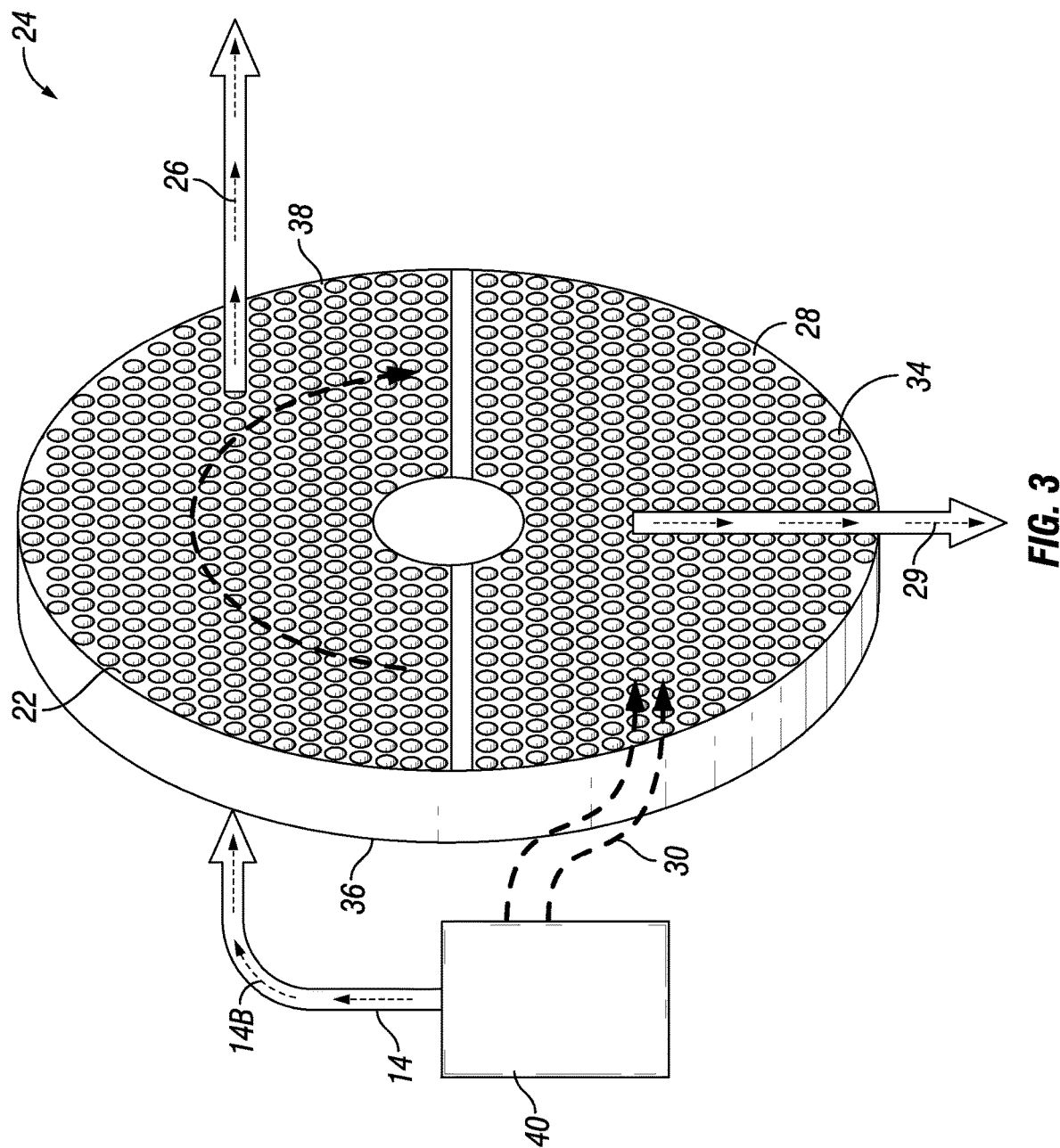
FIG. 3 is a schematic perspective view of a rotary contactor of an onboard carbon dioxide capture system, in accordance with an embodiment of this disclosure.

In embodiments where energy recovery device 16 is a waste heat recovery system using an organic Rankine cycle, additional synergies can be realized. One synergy is the use of the heat of exhaust gases 14 to generate energy output 18 to provide either electrical or mechanical energy for all or part of the energy needed for compressor 20 to compress $CO_2$. Another synergy is the use of the working fluid from the organic Rankine cycle as hot fluid 30, as shown in FIG. 3. The temperature values required for the system will depend on the combination of the working fluid of the energy recovery device 16 and sorbent used with rotary contactor 24. There is a wide range of possible working fluids for an organic Rankine cycle of energy recovery device 16, such as refrigerants, ethanols, and others suitable fluids with a greater boiling point. There are sorbents capable of desorbing $CO_2$ at a wide range of temperatures, such as from 40° C. to 400° C. The combination of working fluid and sorbent can be selected to maximize the efficiency of the system while meeting the target of capturing and compressing 60% or less of the $CO_2$ in exhaust gases 14.

In the example embodiment of FIG. 3, exhaust gases 14 pass through heat exchanger 40 before entering rotary contactor 24. The cooled exhaust gases 14b continue to cooled section 22 while hot fluid 30, which drew heat from exhaust gases 14, are directed to heated section 28 of rotary contactor 24.

Looking at FIG. 3, the solid sorbent material that captures $CO_2$ can form openings 34 of rotary contactor 24. As an example, a binder can be added to the solid sorbent material so that the solid sorbent material can be formed into structured ducts. Alternately, the solid structured ducts can be formed of an inert material and the solid sorbent can be a coating of rotary contactor 24. The solid sorbent material can be any solid material that has greater affinity to $CO_2$ compared to its affinity to nitrogen. A wide range of material is possible for use as the solid sorbent including those with physical or chemical adsorption. As an example, the solid sorbent can be metal carbonates, metal oxides, zeolites, porous solids, activated carbons, amine functionalized porous or mesoporous material or metal organic frameworks.

Openings 34 extend from first side 36 of rotary contactor 24 to second side 38 of rotary contactor 24 opposite first side 36. Openings 34 can be arranged as a structured sheet in a manner to minimize the pressure drop of exhaust gases 14 as it flows through cooled section 22 of rotary contactor 24 by way of openings 34 from first side 36 to second side 38. Openings 34 can alternately be arranged as a structured sheet and shaped to maximize the sorbent capacity per unit volume of rotary contactor 24 by maximizing the surface area by the thickness of sorbent per unit volume of rotary contactor 24. Rotary contactor 24 can be optimized by minimizing the pressure drop of exhaust gases 14 as it flows through cooled section 22 of rotary contactor 24 while maximizing the sorbent capacity per unit volume of rotary contactor 24. As an example, rotary contactor 24 can have monolith structured packing, or monolith structured packing with corrugation or wire gauze. The size of openings 34 of the structured packing can be in a range of 1-3 millimeters (mm). The thickness and the diameter of the rotary contactor 24 will depend on exhaust gas flow rate, the percentage of $CO_2$ to be removed, the solid sorbent capacity and the acceptable pressure drop of exhaust gases 14.

The ducts or openings 34 can be arranged into a wheel shape of rotary contactor 24 and be connected to a motor that will rotate rotary contactor 24 at a given rate of revolution per unit time. The rate of revolution will depend on the flow rate of exhaust gases 14 and the working capacity of the solid sorbent. As an example, rotary contactor 24 can rotate in a range of 20 seconds to 5 minutes per revolution, depending on the kinetics of the applicable adsorption-desorption.

The solid sorbent material will have an affinity for $CO_2$ and will adsorb $CO_2$ at the pressure and temperature at which exhaust gases 14 are delivered to rotary contactor 24. As an example, the solid sorbent of certain embodiments can adsorb $CO_2$ at a $CO_2$ partial pressure of 0.01 to 0.2 bars or a total pressure of about 1 bar and in a temperature range of ambient to about 100° C. The solid sorbent can also regenerate, or release $CO_2$ at ambient pressure and temperature range of 40 to 300° C. In alternate embodiments where exhaust gases 14 are delivered at an increased pressure, the selected solid sorbent will adsorb $CO_2$ at such increased pressure, such as at a total pressure in a range of 1.2 to 5 bars. For example for activated carbon, the adsorption could be at ambient temperature and the release temperature at 50 to 60° C. In example embodiments where the sorbent is a zeolite, the adsorption could be at ambient to 40° C. and release at 100-200° C., and where the sorbent is magnesium carbonate based, the adsorption could be around 250° C. and regeneration at 300° C.

Figure 4:
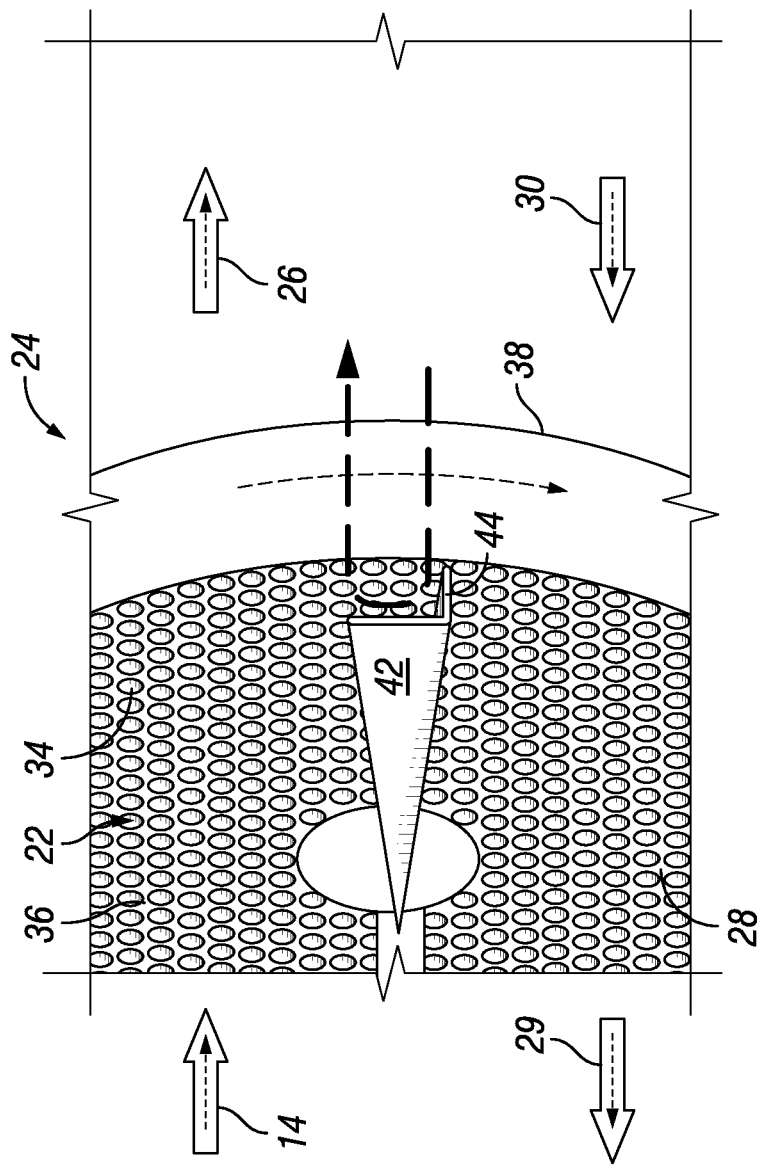
FIG. 4 is a schematic partial view of a rotary contactor of an onboard carbon dioxide capture system with a purge sector, in accordance with an embodiment of this disclosure.

Looking at FIG. 4, in order to limit the mixing of exhaust gases 14 as it passes through rotary contactor 24 and exits as non-$CO_2$ components 26, with released $CO_2$ 29 that is removed from the sorbent of rotary contactor 24 by the flow of hot fluid 30, a small purge sector 42 can be used. Purge sector 42 can assist in recovering released $CO_2$ 29 from heated section 28 without mixing released $CO_2$ 29 with exhaust gases 14, and can assist with minimizing interactions between the fluid flow of heated section 28 and cooled section 22.

As an example, purge sector 42 can be located at a small distance apart from rotary contactor 24 adjacent second side 38 of rotary contactor 24 at the junction of cooled section 22 and heated section 28. Along one side, purge sector 42 has a lip 44 that almost touches rotary contactor 24, to prevent gases from flowing in the direction past lip 44. The opposite side the purge sector 42 is open, with no lip, to allow gases to flow out from this side. As released $CO_2$ 29 initially emerges from heated section 28 at the location of purge sector 42, released $CO_2$ will be mixed with remnant exhaust gas due to the proximity to the flow of exhaust gas. The emerging mixture is prevented from contaminating the more pure stream of released $CO_2$ 29 by purge sector 42 and is instead directed to mix with the stream of exhaust gases 14 at the open side of purge sector 42.

Looking at FIG. 1, in an example of operation, in a method for capturing $CO_2$ from exhaust gases 14, exhaust gases 14 of vehicle 12 are delivered to cooled section 22 of rotary contactor 24. A sorbent of cooled section 22 adsorbs the $CO_2$ of exhaust gases 14 while non-$CO_2$ components 26 of exhaust gases 14 pass through openings 34 (FIG. 3) of rotary contactor 24. As rotary contactor 24 rotates, cooled section 22 is heated with hot fluid 30 of vehicle 12, converting cooled section 22 of rotary contactor 24 to heated section 28 of rotary contactor 24 and releasing released $CO_2$ 29 from the sorbent. As rotary contactor 24 continues to rotate, heated section 28 of rotary contactor 24 is cooled with exhaust gases 14 to convert heated section 28 of rotary contactor 24 back to cooled section 22 of rotary contactor 24. Released $CO_2$ 29 can be compressed with compressor 20 and stored in storage unit 32.

In the example embodiment of FIG. 1, exhaust gases 14 pass through energy recovery device 16 before exhaust gases 14 enter rotary contactor 24. Energy recovery device 16 can generate energy for compressing released $CO_2$ 29 with compressor 20. In the example embodiment of FIG. 2, exhaust gases 14 instead enter energy recovery device 16 after exhaust gases 14 pass through rotary contactor 24. In the example embodiment of FIG. 3, exhaust gases 14 pass through heat exchanger 40 before entering rotary contactor 24. Heat exchanger 40 can be used in an embodiment without any energy recovery device 16, can be used downstream of energy recovery device 16 (such as added to the embodiment of FIG. 1), or can be used upstream of energy recovery device 16 (such as added to the embodiment of FIG. 2).

EXAMPLE

In an example of use of the methods and systems of this disclosure, vehicle 12 can emit on average 150 grams (g) of $CO_2$ per kilometer, while traveling at a speed of 100 kilometers (km) per hour (km/hr). In order to reduce $CO_2$ emissions by 60%, 9 kilograms (kg) of $CO_2$ per hour needs to be captured. Assuming a modest working capacity of a solid sorbent material of 3 weight % and a cycle time of one minute, then the amount of solid sorbent needed is 5 kg. For a (porous) solid density of 1 gram per centimeters cubed (g/cm3), and a wheel thickness of 10 cm, rotary contactor 24 will therefore need to have a diameter of 25 cm. A 25 cm rotary contactor 24 can fit easily within many types of vehicles 12.

In the example embodiments of FIGS. 1-4, systems and methods of integrating the capture of $CO_2$ of rotary contactor 24 with energy recovery, $CO_2$ compression and temporary onboard storage of $CO_2$ are disclosed. Embodiments of this disclosure provide for a compact design for onboard applications to fit the system in compact cars. Integrated energy management of embodiments of this disclosure saves fuel consumption, resulting in reduced generation of $CO_2$, which in turn reduces the amount of $CO_2$ emissions.

Embodiments of this disclosure also provide systems and methods that do not require the addition of water for enhancing the control and separation of $CO_2$. Water storage on board vehicles is not practical because carrying and refilling the required amount of water will reduce the vehicle fuel economy and be an inconvenience for the owner or operator. In addition, there will be wasted heat when the exhaust gas has to be cooled from ~400° C. to less than 100° C., as in some current systems that require additional water.

Embodiments of the current application further solve the problem of long cycle times of some current systems using solid sorbents in capturing $CO_2$ in mobile applications. In addition, further efficiencies and synergies and a more compact design are realized in embodiments of the current application when using turbocompounding waste heat recovery.

Embodiments of the disclosure described, therefore, are well adapted to carry out the objects and attain the ends and advantages mentioned, as well as others that are inherent. While example embodiments of the disclosure have been given for purposes of disclosure, numerous changes exist in the details of procedures for accomplishing the desired results. These and other similar modifications will readily suggest themselves to those skilled in the art, and are intended to be encompassed within the spirit of the present disclosure and the scope of the appended claims.

What is claimed is:

1. A method for capturing carbon dioxide ($CO_2$) in exhaust gas of a vehicle, the method including:
   locating a rotary contactor onboard the vehicle;
   delivering a stream of the exhaust gas of the vehicle to a cooled section of a rotary contactor, the rotary contactor including openings that extend from a first side of the rotary contactor to a second side of the rotary contactor opposite the first side;
   adsorbing the $CO_2$ of the exhaust gas with a sorbent of the cooled section of the rotary contactor, where non-$CO_2$ components of the exhaust gas pass through the openings;
   heating the cooled section of the rotary contactor with a hot fluid of the vehicle to release the adsorbed $CO_2$ as a released $CO_2$ stream and converting the cooled section of the rotary contactor to a heated section of the rotary contactor;
   directing a mixture of the released $CO_2$ stream and the exhaust gas towards the stream of the exhaust gas with a purge sector; and
   cooling the heated section of the rotary contactor to convert the heated section of the rotary contactor back to the cooled section of the rotary contactor.

2. The method of claim 1, where the exhaust gas is delivered to the cooled section of the rotary contactor in a direction perpendicular to a plane of rotation of the rotary contactor.

3. The method of claim 1, where the sorbent is a solid sorbent coating and the method further includes locating the solid sorbent on a structured sheet.

4. The method of claim 3, where the structured sheet includes the openings and the method further includes maximizing a sorbent capacity per unit volume of the rotary contactor.

5. The method of claim 3, where the structured sheet includes the openings and the method further includes minimizing a pressure drop of the exhaust gas as it passes through the openings from the first side to the second side.

6. The method of claim 1, further including before delivering the exhaust gas of the vehicle to the cooled section of the rotary contactor, passing the exhaust gas through an energy recovery device, the energy recovery device generating energy for compressing the released $CO_2$.

7. The method of claim 6, where the hot fluid of the vehicle is a working fluid of an organic Rankine cycle energy recovery device.

8. The method of claim 1, where the hot fluid of the vehicle is a hot coolant of the vehicle and heating the cooled section of the rotary contactor with a hot fluid of the vehicle includes heating the cooled section of the rotary contactor with the hot coolant.

9. The method of claim 1, where the hot fluid of the vehicle is a fluid heated by the exhaust gas in a heat exchanger.

10. The method of claim 9, where cooling the heated section of the rotary contactor includes cooling the heated section of the rotary contactor with the exhaust gas downstream of the heat exchanger.

11. The method of claim 1, further including compressing and storing the released $CO_2$ onboard the vehicle.

12. A method for capturing carbon dioxide ($CO_2$) in exhaust gas of a vehicle, the method including:
   locating a rotary contactor onboard the vehicle;
   delivering a stream of the exhaust gas of the vehicle to a cooled section of a rotary contactor, the rotary contactor including openings that extend from a first side of the rotary contactor to a second side of the rotary contactor opposite the first side;
   adsorbing the $CO_2$ of the exhaust gas with a sorbent of the cooled section of the rotary contactor;
   rotating the rotary contactor so that the cooled section of the rotary contactor is in a path of a hot fluid of the vehicle and heating the cooled section of the rotary contactor to release the adsorbed $CO_2$ as a released $CO_2$ stream, converting the cooled section of the rotary contactor to a heated section of the rotary contactor;
   directing a mixture of the released $CO_2$ stream and the exhaust gas towards the stream of the exhaust gas with a purge sector; and
   rotating the rotary contactor so that the heated section of the rotary contactor is in a path of the exhaust gas and cooling the heated section of the rotary contactor with the exhaust gas to convert the heated section of the rotary contactor back to the cooled section of the rotary contactor; where the exhaust gas passes through an energy recovery device, the energy recovery device generating energy for compressing the released $CO_2$; and the rotary contactor and the energy recovery device are located onboard the vehicle.

13. The method of claim 12, where the exhaust gas is delivered to the cooled section of the rotary contactor in a direction perpendicular to a plane of rotation of the rotary contactor.

14. The method of claim 12, where the sorbent is a solid sorbent coating located on a structured sheet that includes the openings.

15. The method of claim 12, where the exhaust gas passes through the energy recovery device before delivering the exhaust gas to the cooled section of the rotary contactor.

16. The method of claim 12, where the exhaust gas passes through the energy recovery device after delivering the exhaust gas to the cooled section of the rotary contactor.

17. A system for capturing carbon dioxide ($CO_2$) in exhaust gas of a vehicle, the system including:
   a rotary contactor located onboard the vehicle, the rotary contactor having a cooled section operable to receive delivery of a stream of the exhaust gas of the vehicle, the rotary contactor including openings that extend from a first side of the rotary contactor to a second side of the rotary contactor opposite the first side;
   a sorbent located on the cooled section of the rotary contactor operable to adsorb the $CO_2$ of the exhaust gas; and
   a hot fluid directed at the cooled section of the rotary contactor operable to release the adsorbed $CO_2$ as a released $CO_2$ stream and convert the cooled section of the rotary contactor to a heated section of the rotary contactor;
   a purge sector operable to direct a mixture of the released $CO_2$ stream and the exhaust gas towards the stream of the exhaust gas; where
   the rotary contactor is rotatable so that the heated section of the rotary contactor is cooled to convert the heated section of the rotary contactor back to the cooled section of the rotary contactor.

18. The system of claim 17, where the exhaust gas is delivered to the cooled section of the rotary contactor in a direction perpendicular to a plane of rotation of the rotary contactor.

19. The system of claim 17, where the sorbent is a solid sorbent coating located on a structured sheet.

20. The system of claim 19, where the structured sheet includes the openings and is shaped to maximize a surface area multiplied by a thickness of the sorbent per a unit volume of the rotary contactor.

21. The system of claim 19, where the structured sheet includes the openings and has a monolith structured packing.

22. The system of claim 17, further including an energy recovery device operable to generate energy for compressing the released $CO_2$.

23. The system of claim 17, further including a compressor operable to compress the released $CO_2$ and a storage unit for storing the compressed $CO_2$.

* * * * *